Nov. 17, 1959    G. W. LEYEN    2,912,972
AUTO-PICNIC TABLE GRILL
Filed Jan. 25, 1957    2 Sheets-Sheet 1
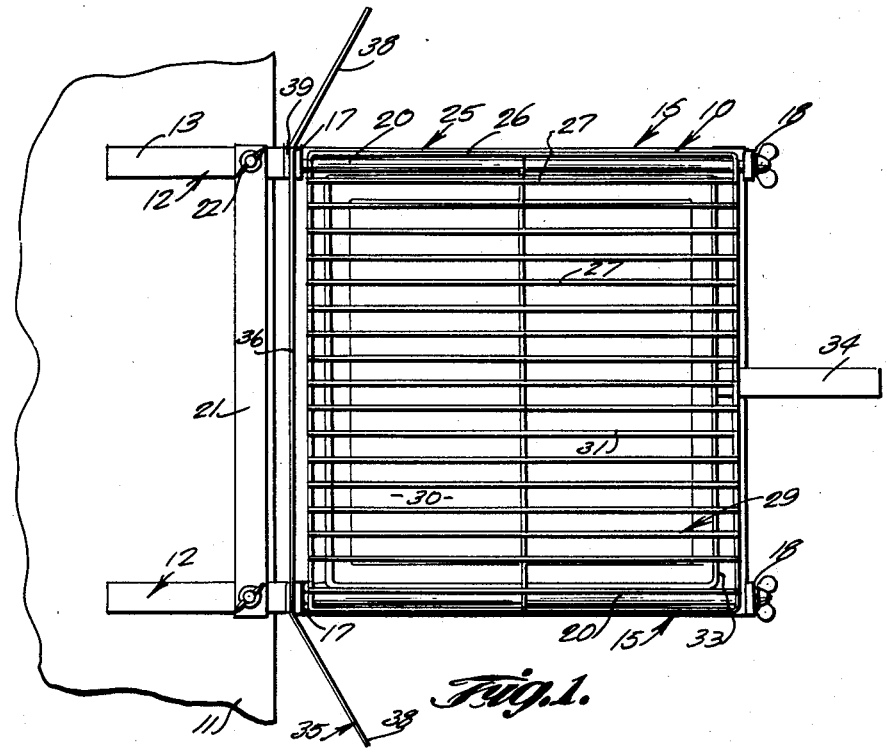
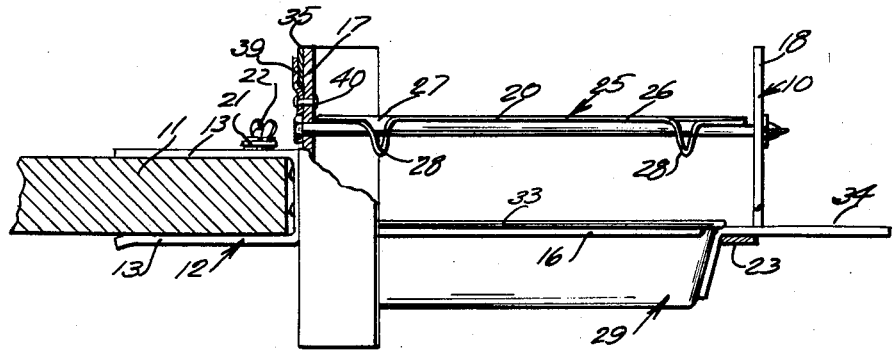
INVENTOR.
George W. Leyen
BY Victor J. Evans & Co.
ATTORNEYS Nov. 17, 1959  G. W. LEYEN  2,912,972
AUTO-PICNIC TABLE GRILL
Filed Jan. 25, 1957  2 Sheets-Sheet 2
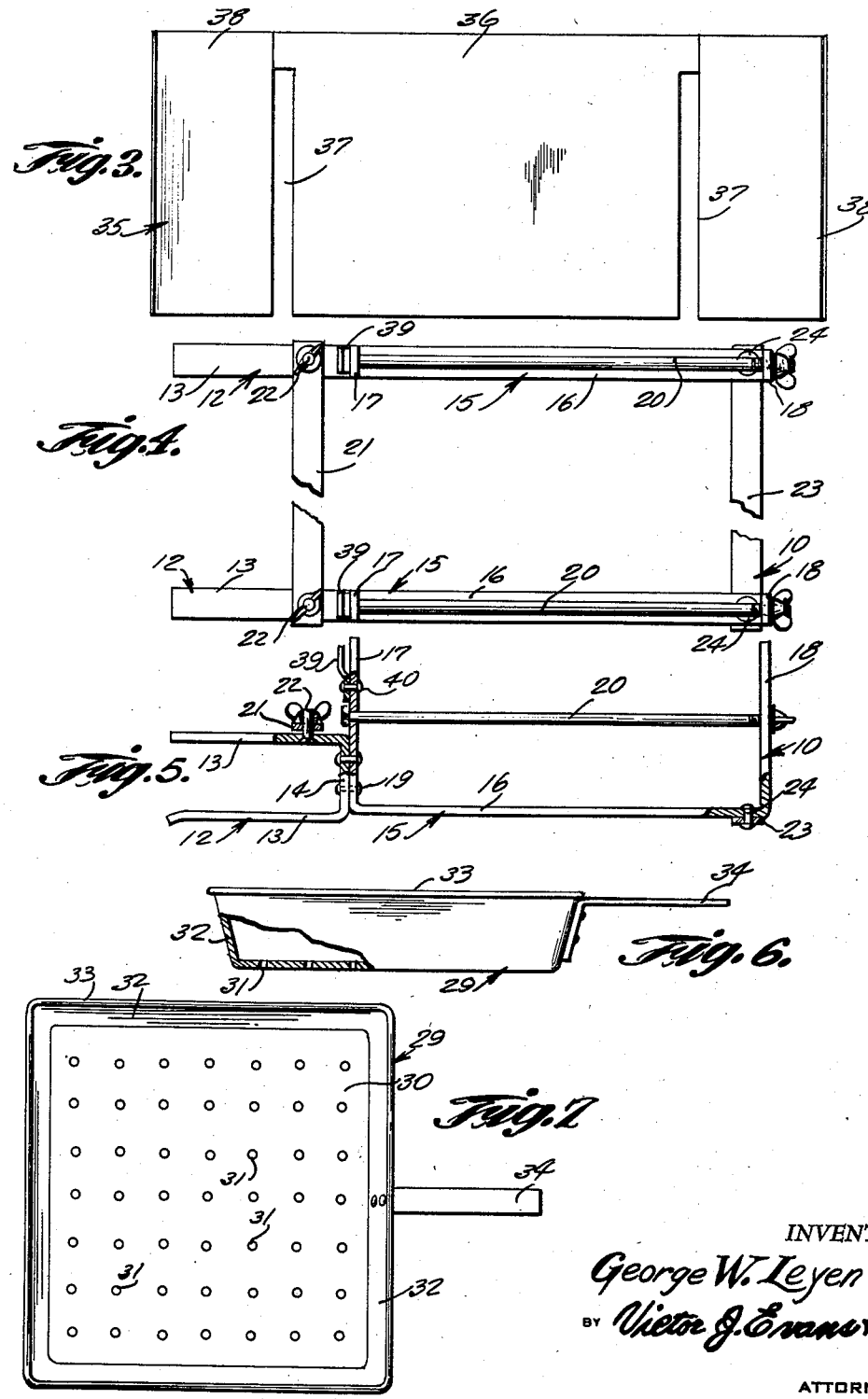

United States Patent Office 2,912,972
Patented Nov. 17, 1959

2,912,972

AUTO-PICNIC TABLE GRILL

George W. Leyen, Rollinsville, Colo.

Application January 25, 1957, Serial No. 636,412

1 Claim. (Cl. 126—25)

This invention relates to a grill, and more particularly to a grill which is adapted to be attached to a picnic table or other supporting structure.

The object of the invention is to provide a grill which can be readily attached to or detached from a supporting structure such as a picnic table whereby various foodstuffs can be readily prepared or cooked.

Another object of the invention is to provide a grill which is adapted to be detachably connected to a suitable supporting structure such as a picnic table so that foodstuffs can be conveniently prepared or cooked outdoors, and whereby there is provided a means for preventing the heat from the grill from damaging the picnic table or other members associated therewith.

A further object of the invention is to provide a picnic table grill which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a top plan view illustrating the grill of the present invention and showing the grill attached to a portion of a picnic table.

Figure 2 is a side elevational view of the assembly shown in Figure 1, and with parts broken away and in section.

Figure 3 is an elevational view illustrating the baffle for preventing heat from the grill from damaging the picnic table or parts on the picnic table.

Figure 4 is a plan view of the grill showing the grill removed from the table and showing the container and rack removed from the grill.

Figure 5 is a side elevational view of the framework shown in Figure 4, and with parts broken away and in section.

Figure 6 is a side elevational view of the container for holding charcoal or the like, and with parts broken away and in section.

Figure 7 is a plan view of the container shown in Figure 6.

Referring in detail to the drawings, the numeral 10 indicates the grill of the present invention, and the grill 10 is adapted to be releasably or detachably connected to a suitable supporting structure, such as a picnic table 11, Figures 1 and 2. A means is provided for releasably attaching the grill 10 to table 11, and this means comprises a pair of U-shaped clamps which are each indicated by the numeral 12. Each clamp 12 includes a pair of horizontally disposed spaced parallel arms 13, and a vertically disposed web 14.

The grill 10 includes a pair of spaced apart support members 15, and each support member 15 includes a horizontally disposed bar 16 and a pair of upstanding or vertically disposed spaced parallel legs 17 and 18. The legs 17 are connected to the web 14 of the clamps 12 in any suitable manner, as for example by means of suitable securing elements such as the rivets 19. The pair of support members 15 are arranged in end to end relationship or aligned relationship with respect to the clamps 12.

Extending between the legs 17 and 18 of each support member 15 is a rod 20, and the rods 20 are horizontally disposed and are arranged in spaced parallel relation with respect to each other. An end of each rod 20 is threaded, and a wing nut is arranged on the threaded end of each rod 20 as shown in Figures 4 and 5.

Extending between the uppermost arms 13 of the pair of clamps 12 is a horizontally disposed brace 21, and the brace 21 is connected to the clamps 12 through the medium of bolt and nut assemblies 22. A cross piece 23 extends between the bars 16 of the pair of support members 15, and the cross piece 23 is secured in place by means of suitable securing elements such as rivets 24, the cross piece 23 helping to maintain the pair of support members 15 in their proper spaced apart relationship with respect to each other.

A means is provided for supporting the foodstuffs being cooked, and this means comprises a rack or grill which is indicated generally by the numeral 25. The rack 25 may be made of any suitable material such as heavy wire or rods, and the rack 25 includes an outer rectangular frame 26 and a plurality of spaced parallel food supporting elements 27. Portions of the frame 26 of the rack 25 are shaped to include down turned retaining or positioning lugs or fingers 28 which are arranged externally of the rod 20 whereby the rack 25 will be maintained on the rod 20.

There is further provided a means for supporting or holding the charcoal or other material which is used to heat the foodstuff that is supported by the rack 25, and this last named means comprises a container which is indicated generally by the numeral 29, Figures 6 and 7. The container 29 includes a horizontally disposed bottom wall 30 which is provided with a plurality of spaced apart apertures or openings 31, and the container 29 further includes a plurality of upstanding outwardly inclined walls 32. The upper edge of each wall 32 terminates in a bead or rim 33, and portions of the beads 33 are adapted to engage the bars 16 of the support members 15 whereby the container 29 will be supported between the pair of support members 15 as shown in Figures 1 and 2 for example. A handle 34 extends outwardly from the container and is secured thereto whereby the container can be readily manually moved as required or desired.

A means is provided for preventing heat from the grill from scorching or otherwise harming the table 11, and this means comprises a baffle or partition which is indicated generally by the numeral 35. The partition 35 includes a main central portion 36 and angularly arranged end portions 38, Figure 3, there being a pair of slots or cutouts 37 in the baffle 35 whereby portions of the support members 15 can extend through the slots 37. For supporting the baffle 35, clips 39 may be secured to the legs 17 by suitable securing elements such as the rivets 40, Figures 2 and 5.

From the foregoing, it is apparent that there has been provided a grill which can be used for outdoor cooking and the grill is constructed so that it can be readily connected to a suitable supporting structure such as the picnic table 11. However, it is to be understood that the grill can be connected to other types of supporting structures besides the picnic table 11. In use, the pair of clamps 12 are adapted to engage an end portion of the picnic table top 11 as shown in Figures 1 and 2 whereby the grill 10 can be conveniently supported adjacent to the table.

The container 29 is adapted to be used for holding charcoal which can be ignited in the usual manner, and openings 31 are provided in the container 29 whereby grease or the like can drip through these openings, and whereby the openings can serve to provide sufficient air to support the combustion of the charcoals. The grill includes the pair of spaced apart support members 15, and the support members 15 include the lower bar 16. The pair of bars 16 coact with the cross piece 23 to provide members that are engaged by the beads 33 on the upper edge of the container 29 and the handle 34, Fig. 2, whereby the container 29 is supported in the proper position. By means of the handle 34, the container 29 can be readily moved as when the container 29 is to be cleaned or refilled. The grill further includes the grate or rack 25 which is supported by the pair of rods 20, and the downwardly extending lugs 28 insure that the rack 25 will be maintained in its proper position on the rods 20. The rack 25 is adapted to support the foodstuffs which are being cooked or heated. Since the various parts are connected together by suitable securing elements, such as bolt and nut assemblies, the grill can be readily disassembled when it is not being used whereby it can be stored in a small space. The baffle 35 is provided for insuring that the heat from the charcoal or fuel in the container 29, will not damage or scorch the picnic table 11 or other members which may be on the picnic table. By supporting the grill 10 adjacent to the picnic table, persons using the table to eat off can conveniently use the grill for cooking or heating different types of foods.

The parts can be made of any suitable material and in different shapes or sizes. By means of the baffle 35, the heat from the grill will be prevented from burning or setting fire to the picnic table or the like.

I claim:

In a grill, a pair of U-shaped clamps adapted to be secured to a supporting structure, each of said clamps including a pair of horizontally disposed spaced parallel arms and a vertically disposed web extending between said pair of arms, a horizontally disposed brace connecting the uppermost arms of said clamps together, a pair of U-shaped support members arranged in end to end relation with respect to said clamps, and each support member including a horizontally disposed bar and a pair of vertically disposed spaced parallel legs, the webs of said clamps being secured to the adjacent legs of said support members, a horizontally disposed cross piece extending between the bars of said support members and secured thereto, a pair of spaced parallel horizontally disposed rods extending between the legs of said support members and supported thereby, a rack supported by said rods and including an outer rectangular frame and a plurality of spaced parallel food supporting elements, portions of said frame being shaped to include downwardly extending retaining lugs that are positioned externally of said rods to maintain the rack on said rods, and a fire container arranged between said pair of support members and supported thereby, said container including a bottom wall provided with a plurality of apertures therein, said container further including a plurality of upwardly and outwardly diverging side walls, said side walls terminating in upper beads for engagement with the bars of said support member, a handle connected to said container and engaging said crosspiece, a baffle positioned between said grill and said supporting structure, said baffle including a plate provided with a pair of spaced parallel vertically disposed slots for the projection therethrough of portions of said support members, the outer end portions of said plate being arranged angularly with respect to the central portion thereof, clips secured to said legs and engaging said baffle to retain said baffle in position so that said baffle when so positioned extends above and below said fire container.

References Cited in the file of this patent

UNITED STATES PATENTS

| | | |
|---|---|---|
| 587,101 | Lombard et al. | July 27, 1897 |
| 648,860 | Doyle | May 1, 1900 |
| 838,421 | Kerstetter | Dec. 11, 1906 |
| 1,108,692 | Burd | Aug. 25, 1914 |
| 1,187,664 | Sichel | June 20, 1916 |
| 1,224,267 | Brewer | May 1, 1917 |
| 1,477,831 | Kohl | Dec. 18, 1923 |
| 1,879,372 | McComb | Sept. 27, 1932 |
| 1,890,743 | Murphy et al. | Dec. 13, 1932 |
| 2,106,538 | Schmitt | Jan. 25, 1938 |
| 2,292,377 | Howard | Aug. 11, 1942 |
| 2,376,640 | Wall et al. | May 22, 1945 |
| 2,469,885 | Molla | May 10, 1949 |
| 2,545,005 | Russell | Mar. 13, 1951 |
| 2,667,392 | Sexton | Jan. 26, 1954 |
| 2,672,988 | Johnson | Mar. 23, 1954 |
| 2,780,215 | Vacanti | Feb. 5, 1957 |
| 2,797,814 | Sinclair | July 2, 1957 |

FOREIGN PATENTS

| | | |
|---|---|---|
| 23,610 | Great Britain | 1908 |